United States Patent [19]
Honeywell et al.

[11] 3,736,449
[45] May 29, 1973

[54] ELECTRICAL APPARATUS

[75] Inventors: Charles C. Honeywell; L. H. Voige, both of Montrose, Pa.

[73] Assignee: The Bendix Corporation, Teterboro, N.J.

[22] Filed: Jan. 18, 1971

[21] Appl. No.: 107,555

Related U.S. Application Data

[62] Division of Ser. No. 707,043, Feb. 21, 1968, Pat. No. 3,614,577.

[52] U.S. Cl.................................310/171, 310/266
[51] Int. Cl....................................H02k 17/44
[58] Field of Search............310/171, 191, 184–188, 310/194, 254, 258, 266, 89, 166, 211; 318/243; 376/75, 79, 135, 10

[56] References Cited

UNITED STATES PATENTS

| 2,571,810 | 10/1951 | Andresen, Jr. | 310/49 R |
|---|---|---|---|
| 3,453,466 | 7/1969 | Olson | 310/266 X |
| 3,017,528 | 1/1962 | Ellis | 310/191 |
| 2,889,475 | 6/1959 | Emerson | 310/171 |
| 2,756,357 | 7/1956 | Schaberg | 310/266 X |
| 3,248,584 | 4/1966 | Knauer | 310/171 |
| 2,671,180 | 3/1954 | Goldberg | 310/191 X |
| 2,819,417 | 1/1958 | Glass | 310/258 |

FOREIGN PATENTS OR APPLICATIONS

| 644,773 | 10/1950 | Great Britain | 310/171 |

*Primary Examiner*—D. F. Duggan
*Attorney*—Sylvester H. Hartz and Anthony F. Cuoco

[57] ABSTRACT

A synchro electrical signal generator or rotary control transformer in combination with an induction servo motor, said transformer and motor having a common rotor shaft.

19 Claims, 6 Drawing Figures

Patented May 29, 1973
3,736,449
2 Sheets-Sheet 2
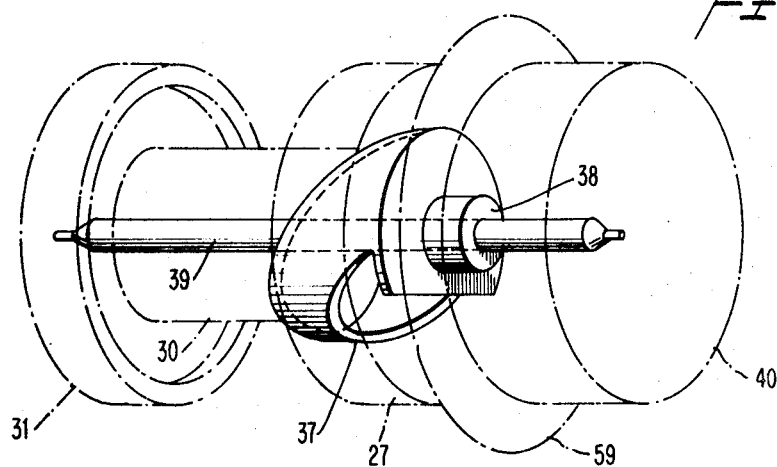
Fig. 3
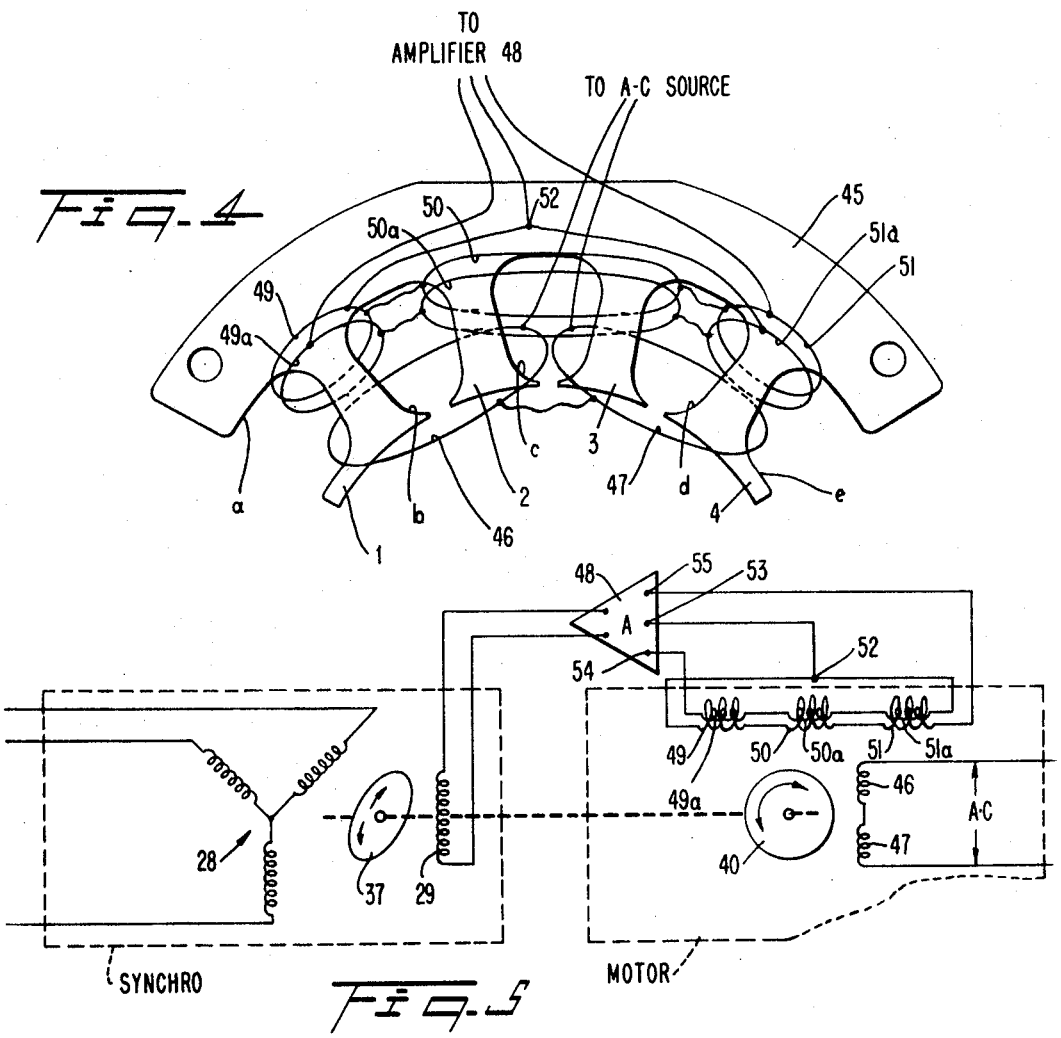
Fig. 4
Fig. 5

ELECTRICAL APPARATUS

This application is a division of application Ser. No. 707,043, filed Feb. 21, 1968, for "Electrical Apparatus", now U.S. Pat. No. 3,614,577.

This invention relates to electrical apparatus and more particularly to apparatus for synchronously converting electrical signals into torque energy.

One of the objects of the present invention is to provide a novelly constructed synchronous electrical signal generator.

Another object of the invention is to provide a novelly constructed servo induction motor and the novel combination thereof with a rotary control transformer, whereby weight and space are effectively conserved and efficiency is enhanced.

A further object is to provide a novel synchronous transmission system wherein the number of parts required and friction losses are effectively minimized.

A still further object is to provide a novel low torque synchro-servo motor assembly wherein motor torque is transmitted directly from the motor to the synchro rotor without interposed gearing or the like, to thereby eliminate excess friction and to permit a reduction of the inertia of moving parts with a corresponding increase in the operational stability of the system.

Still another object is to provide a novel combination of a synchro and servo motor wherein undesirable inductive coupling between the windings of the synchro and motor, as well as single phasing of the motor, are avoided.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a sectional view on an enlarged scale of one form of apparatus embodying the invention, the section being taken on lines 1—1 of FIGS. 2 and 6;

FIG. 3 is a detail isometric view of the synchro rotor shown in FIG. 1, with other parts of the apparatus schematically illustrated in phantom;

FIG. 4 is a detail end elevation of the motor stator rim core as viewed from the right in FIG. 1 with a schematic illustration of the windings thereon;

FIG. 5 is a schematic wiring diagram of the electrical circuitry embodied in the apparatus of FIG. 1.

Figure 1:
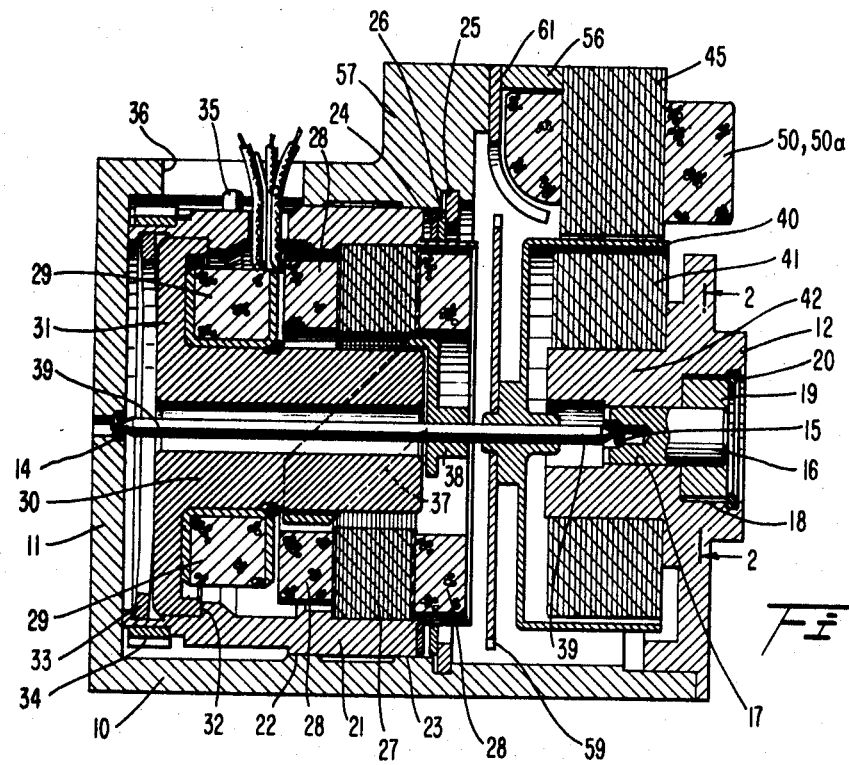

The single embodiment of the invention illustrated in the drawings, by way of example, is in the form of a novelly constructed variable rotary control transformer combined in a novel manner with a novelly constructed induction type servo motor. The combination comprises a hollow generally cylindrical casing 10 having a wall 11 at one end and being partially closed at its other end by a cover 12. To substantially frictionlessly support the unitary rotor of the synchro and motor to be hereinafter described, a frictionless bearing 14 is mounted in end wall 11 and a similar bearing 15 is supported for axial adjustment in a novel manner by cover 12.

As illustrated bearing 15 is mounted in a recess in the inner end of cylindrical holder or bar 16 which has a close sliding fit in an axial bore 17 in cover 12. The outer end of holder 16 extends into an enlarged counterbore 18 in cover 12 and has a locking sleeve 19 closely surrounding it. The sleeve has an outside diameter appreciably less than the diameter of counterbore 18 and is retained therein by a split and bowed resilient snap ring 20. When holder 16 has been suitably axially positioned in bore 17, a radial set screw 16' (FIG. 2) is screwed in against sleeve 19 to thereby apply a radial force to holder 16 and frictionally bind the latter against axial movement in bore 17.

The synchro or control transformer comprises a stator assembly rotatably mounted for angular adjustment in casing 10 and a rotor supported in bearings 14, 15. As shown, the stator assembly includes a cylindrical housing 21 journalled on spaced ribs 22 and 23 in casing 10 and held in yieldably abutting engagement with end wall 11 by a wavy spring washer 24 interposed between an external shoulder on the housing and a split retaining ring 25 seated in an internal groove in the casing. Ring 25 may be supplemented by a rigid ring 26 having a smaller inside diameter.

A stack 27 of annular laminations of magnetic material is cemented or otherwise suitably secured in housing 21 and is radially slotted in a manner common and well known in the art to provide a plurality of radially inwardly extending poles. A winding 28 consisting of three Y-connected coils is wound on said poles in a manner well known in the synchro art for connection to a similar stator winding of a remote signal transmitting synchro.

A spool or bobbin type coil 29 which functions as the secondary winding of a transformer is mounted on a tubular core 30 of magnetic material. Said core extends through stator ring 27 and is supported concentrically therewith by an integral flange or spider 31 piloted or otherwise suitably mounted in the end of housing 21. Core 30, 31 is axially retained in the housing against a shoulder 32 by a bowed and split retaining ring 33 of resilient material. If desired, core 30 may be mounted in a known manner for radial adjustment, such as by making flange 31 somewhat smaller and supporting the same on radial set screws spaced 90° apart in housing 21.

Figure 6:
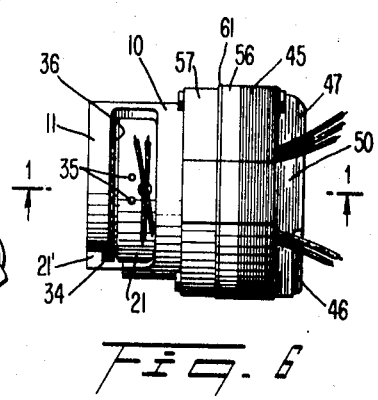
FIG. 6 is a full-scale, top plan view of the apparatus of FIG. 1.

To effect angular adjustment of the stator assembly in casing 10, an external ring gear 34 is mounted on housing 21, and casing 10 may be provided with an opening 21' in the wall thereof (FIG. 6) to permit engagement of said gear by a pinion or rack (not shown) adapted to be actuated exteriorly of the casing. Such angular adjustment of the synchro stator relative to casing 10 may be limited by circumferentially spaced stops 35 secured to housing 21 and adapted to engage the end edges of an opening 36 in the wall of casing 10. The leads from windings 28 and 29 may also be brought out through opening 36 between stops 35.

In the illustrated embodiment, the synchro rotor comprises a single shorted turn 37 of electrically conductive metal encircling core 30 at a 45° angle to the axis thereof within the annular stator pole shoes stack 27. The conductive turn 37 has an integral hub portion 38 by means of which it is supported on a shaft 39 for rotation therewith. The shaft is frictionlessly supported at its ends by bearings 14 and 15 in casing 10. It will be seen that core 30 functions as a path transversely of the rotor axis for magnetic flux between the tips or faces of the pole shoes on annular stack 27 to inductively couple winding 28 with the shorted turn 37 of the rotor. Similarly, said shorted turn and coil 29 are inductively coupled by a magnetic flux path comprising core 30, 31, housing 21, and stack 27.

To reduce weight, number of parts, inertia and friction losses and thereby increase the stability and efficiency of a transmission system embodying a synchro cooperating with a torque producing servo motor, the present invention contemplates a novel combination of these two cooperating units. In the specific form illustrated, the rotor of the motor, which is in the form of a drag cup 40, is mounted on the same shaft 39 with synchro rotor 37, 38, thereby providing a direct connection between the rotors of the synchro and the motor. The cylindrical flange of the drag cup rotor 40 surrounds a center core comprising an annular stack 41 of laminations of magnetic material mounted on a boss 42 extending inwardly from casing cover 12 around shaft 39.

The novel construction of the rim stator of the induction servo motor conserves space and weight and in the form shown, comprises a laminated arcuate stator core or pole member 45 subtending an angle of about 120°. The inner periphery of said rim pole member has three radial slots b, c and d, and the ends thereof have slots a and e to provide four radial poles 1, 2, 3 and 4 with arcuate faces adjacent the periphery of rotor cup 40. If desired, center core 41 may be limited to an arc commensurate with rim core 45.

Fixed and control phase coils are novelly wound on the poles of stator member 45 to cause rotation of rotor 40 when both said coils are energized while avoiding so-called single phasing of the motor and inductive pick-up by the synchro windings from the motor coils. As shown, the fixed phase winding comprises two oppositely wound coils 46 and 47 connected in series across an AC source of electrical energy which is 90° out of phase with the energizing source for the control phase winding described below. Coil 46 is wound in slots a and c around poles 1 and 2. Coil 47, having the same number of turns as coil 46, is wound in slots c and e around poles 3 and 4, thereby distributing the winding equally and symmetrically with respect to the circumferential or arcuate center of stator member 45. The magnetic flux generated by coils 46 and 47 will be equal and of opposite polarity. Hence, the tendency of either said coil to induce a voltage and resultant current flow in the nearby synchro coils will be offset and cancelled by an equal and opposite tendency by the other said coil.

The control phase winding of the motor is energizable by the synchro secondary winding 29 through a suitable known type of amplifier 48 (FIG. 5) and as shown comprises in effect six coils 49, 49a, 50, 50a, 51 and 51a. These coils are wound with two continuous lengths of wire and center tapped at 52. The coils 49, 50 and 51 will thus be connected in series across terminals 53 and 55 of amplifier 48, and coils 49a, 50a and 51a will be connected in series across terminals 53 and 54 of the amplifier. The three coils of the control phase winding may, of course, be wound in series from a single wire or strand without a center tap and connected to a suitable amplifier having only two output terminals.

In the illustrated embodiment, coil 49, 49a is wound in slots a and b around pole 1, coil 50, 50a is wound in slots b and d around poles 2 and 3, and coil 51, 51a is wound in slots d and e around pole 4. Thus, center coil 50, 50a is centrally disposed on rim core member 45 and end coils 49, 49a and 51, 51a are symmetrically disposed on said member with respect to the arcuate center thereof. Said end coils are wound in the same direction but in opposition to said center coil. In order to prevent the generation of a voltage and a resultant flow of current in the nearby synchro coils 28 and 29 by induction resulting from leakage flux generated by the control phase windings of the motor, the said leakage flux of one polarity is balanced against that of opposite polarity. Thus, the magnetic flux linking coils 49, 49a and 51, 51a with the synchro coils is balanced against the magnetic flux of opposite polarity simultaneously linking coil 50, 50a with the synchro coils. This is accomplished by approximately equalizing the sum total of the lengths of the exposed end turns of coil 50, 50a on the side of member 45 adjacent the synchro with the sum total of the lengths of the corresponding end turns of both coils 49, 49a and 51, 51a. To say it differently, the numbers of turns in coil 50, 50a and in coils 49, 49a and 51, 51a are so proportioned and mounted on core member 45 that the effect of the magnetic flux from coil 50, 50a on the synchro coils will be substantially balanced and offset by the combined opposing flux from coils 49, 49a and 51, 51a. In one satisfactory embodiment of the illustrated device, each of coils 49, 49a, 51, 51a has 162 turns wound on a form having a diameter of 0.320 inch and a width of 0.190 inch, and coil 50, 50a has 234 turns wound on a form having a diameter of 0.520 inch and a width of 0.120 inch.

To further guard against detrimental inductive pick-up by the synchro which would be fed back from winding 29 to the control phase winding of the motor, a metallic radiation shield 61 is provided between the motor windings and the synchro. This shield may be slotted to correspond with the laminations of core member 45 and is preferably contoured partially around the exposed end turns of the motor windings.

The motor stator and shield described above are separated by a spacer 56 and are securely mounted by means of bolts 58 on an arcuate flange 57 projecting radially from casing 10.

Figure 2:
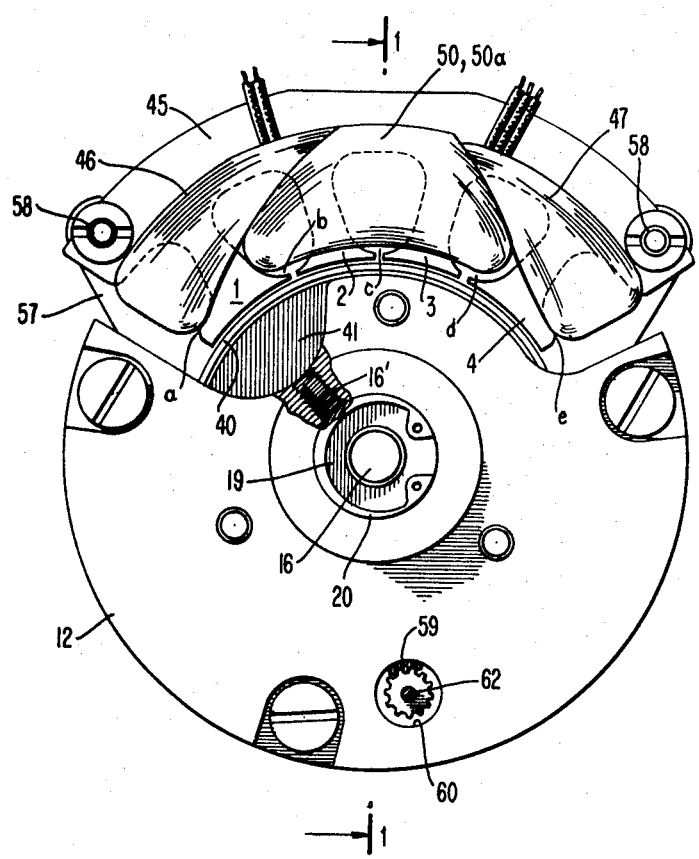
FIG. 2 is an end elevation of said apparatus as seen from the right in FIG. 1, a portion thereof being broken away to show a section taken on line 2—2 of FIG. 1.

When it is desired to transmit the torque or motion of motor rotor 40 to an indicator pointer or the like, as well as to synchro rotor 37, 38, this may be accomplished by mounting a gear 59 of light weight metal, such as aluminum, on shaft 39. Gear 59 may then be meshed with a small pinion 62 on a shaft extending through an opening 60 in cover 12 (FIG. 2).

In operation, when the Y-connected distributed winding 28 of the synchro is energized from a similar synchro transmitter in a manner well understood in the art, the synchro rotor will take up a predetermined null or angular position in which only negligible, if any, current is induced in rotor turn 37, which position corresponds to the angular position of the transmitter rotor that has a winding energized by an AC source. Upon rotation of the transmitter rotor to a new position, the magnetic field generated by winding 28 is correspondingly shifted with respect to the rotor turn 37, and a current is generated in the latter. This current in turn generates a magnetic field which threads spool winding 29 via core 30, casing 21 and core 27, thereby inducing an electrical current in said winding. The current thus generated in winding 29 is amplified by amplifier 48 and fed to the control phase winding of the motor. The source from which the control winding is thus energized being out of phase, usually by 90°, with the energizing source for the so-called fixed phase winding 46, 47, a magnetic field is generated in and repeatedly sweeps across core members 41 and 45 in a direction dependent upon the phase relation of the current inputs to the fixed and control phase windings. In a manner well understood in the art, this moving flux imparts a torque to drag cup rotor 40. This torque is so directed as to rotate shaft 39 and hence, the synchro rotor turn 37, to a new null position corresponding to the new position of the transmitter rotor.

By reason of the substantially frictionless mounting of shaft 39 and the lightness of the combined rotors of the synchro and motor, only a relatively low or small torque is required to rotate shaft 39 whether or not the device is electrically energized. These features also contribute to minimizing friction and inertia of the rotor, and hence, to increasing the operational stability of the apparatus in avoidance of rotor oscillations and overshooting of the synchro null position by the rotor. The novel arrangement of the fixed and control phase windings on the sectoral stator core of the motor avoids the generation of a torsional force and hence single phase rotation of the rotor when only one of said windings is energized.

Although only a limited number of embodiments of the invention have been described in detail in the foregoing specification and only a single embodiment has been illustrated in the accompanying drawings, it is to be expressly understood that the invention is not limited thereto. Various changes may be made in the specific design and arrangement of parts illustrated without departing from the spirit and scope of the invention as will now be apparent to those skilled in the art.

What is claimed is:

1. Electrical apparatus comprising a hollow casing, a cylindrical housing of magnetic material rotatably journalled in said casing, a stator in said housing comprising a slotted annular core and windings thereon, a rotor comprising an electrically conductive winding including at least one turn within said stator and a shaft rotatably supported by the ends of said casing, a core member of magnetic material surrounding said shaft within said rotor winding and having a supporting flange removably piloted in said housing, and a spool type secondary winding on said core member in inductive coupling relation with said rotor winding.

2. Electrical apparatus as defined in claim 1 wherein the stator windings comprise three Y-connected coils circumferentially distributed on the stator core.

3. Electrical apparatus as defined in claim 1 wherein the rotor winding consists of a single electrically conductive loop, the axis of which intersects the rotor axis at an acute angle.

4. Electrical apparatus as defined in claim 1 comprising a bowed ring of resilient material interposed between an annular shoulder in said cylindrical housing and said core member for retaining the latter in the housing.

5. Electrical apparatus as defined in claim 1 comprising means including an annular wavy spring for axially positioning said cylindrical housing in said casing.

6. Electrical apparatus as defined in claim 1 comprising means for rotating said housing in the casing including a ring gear mounted on said housing.

7. Electrical apparatus comprising an arcuate slotted stator of magnetic metal having a plurality of radially inwardly facing poles, a rotor of non-magnetic metal mounted with the peripheral surface thereof adjacent the faces of said poles, a fixed phase winding on the stator consisting of a first pair of oppositely wound coils having equal numbers of turns connected in series and symmetrically disposed with respect to each other on opposite sides of the arcuate center of the stator, and a control phase winding on the stator comprising a second pair of coils having equal numbers of turns wound alike and symmetrically disposed with respect to each other on opposite sides of the arcuate center of the stator and a center coil disposed between the coils of said second pair and symmetrically with respect to the arcuate center of the stator, said center coil and the coils of said second pair being connected in series and the center coil being wound oppositely to the coils of said second pair.

8. Electrical apparatus as defined in claim 7 wherein the sum of the lengths of the end turns of said second pair of coils exposed at one side of the stator is approximately equal to the sum of the lengths of the end turns of said center coil exposed at said one side of the stator, whereby the leakage magnetic flux emanating from said end turns of said second pair of coils and from said end turns of said center coil will be approximately equal and of opposite polarity.

9. In an electrical induction motor, a drag cup rotor and a stator adjacent said rotor comprising an arcuate rim core of magnetic material having radially inwardly projecting poles and being symmetrical with respect to a radial plane containing the axis of the rotor, a fixed phase winding on said core consisting of a pair of series connected coils having equal numbers of turns wound in opposite senses and symmetrically disposed with respect to each other at opposite sides of said plane, and a control phase winding on said core consisting of a center coil centrally disposed on said core and two end coils having equal numbers of turns and disposed on opposite sides of said center coil, said center coil being wound in one sense and said end coils being wound in the opposite sense and said center and end coils being series connected.

10. An induction motor comprising an arcuate stator core of magnetic material comprising four angularly-spaced, radially inwardly extending poles, a fixed phase winding comprising two coils connected in series, one said coil being wound in one sense around the two said poles at one side of the arcuate center of said stator core and the other said coil being wound in the opposite sense around the other two of said poles, and a control phase winding comprising a pair of coils wound in one sense on the end poles of said stator and a center coil wound in the opposite sense around the two center poles of the stator, said center coil and the coils of said pair being connected in series.

11. In electrical apparatus, an induction servo motor comprising a hollow casing, s shaft rotatably supported in said casing, a drag cup rotor mounted on said shaft for rotation therewith, a stator of magnetic material including an inner core portion mounted in said casing around the shaft and within the drag cup rotor and a multi-pole outer core portion mounted on the casing adjacent the outer periphery of the drag cup rotor, the confronting faces of said inner and outer core portions of the stator being concentric with said shaft and said outer core portion being arcuate and subtending an angle of less than 180°, and fixed phase and control phase windings on said outer core portion.

12. Electrical apparatus as defined in claim 11, wherein said outer core portion is radially slotted to form poles facing said drag cup rotor and said inner core portion, and said fixed and control phase windings are wound on said poles.

13. Electrical apparatus as defined in claim 12, wherein said fixed phase winding consists of a pair of oppositely wound coils having equal numbers of turns connected in series and symmetrically disposed with respect to each other on opposite sides of the arcuate center of said outer core portion.

14. Electrical apparatus as defined in claim 12, wherein said control phase winding consists of a pair of similarly wound coils having equal numbers of turns and symmetrically disposed with respect to each other on opposite sides of the arcuate center of said outer core portion and a center coil disposed between the coils of said pair and symmetrically with respect to the arcuate center of said outer core portion, said center coil and the coils of said pair being connected in series and the center coil being wound oppositely to the coils of said pair.

15. Electrical apparatus as defined in claim 12, wherein said outer core portion of the motor stator has four arcuately spaced poles symmetrically disposed with respect to the arcuate center thereof and including two end poles and two central poles therebetween, and said fixed phase winding consists of two oppositely wound coils connected in series each comprising the same number of turns and each wound on a pair of said poles consisting of one end pole and one central pole.

16. Electrical apparatus as defined in claim 15, wherein said control phase winding consists of two like wound coils having equal numbers of turns each wound on a said end pole and an oppositely wound center coil wound on said central poles as a pair, said coils of the control phase winding being connected in series.

17. Electrical apparatus as defined in claim 11, wherein said fixed and control phase windings are in substantial structural and electrical symmetry with respect to the arcuate center of the motor stator.

18. Electrical apparatus as defined in claim 11, wherein said fixed phase winding is constituted by two series connected oppositely wound coils having equal numbers of turns and disposed symmetrically with respect to each other on opposite arcuate halves of said outer core.

19. Electrical apparatus as defined in claim 11, wherein said control phase winding is constituted by a center coil wound in one sense and centrally disposed on said outer core and a pair of coils having equal numbers of turns wound in a sense opposite to that of said center coil and disposed symmetrically with respect to each other on opposite halves of said outer core, said center coil and the coils of said pair being connected in series.

* * * * *